(12) United States Patent
Oteri et al.

(10) Patent No.: US 12,035,251 B2
(45) Date of Patent: Jul. 9, 2024

(54) SYSTEM AND METHOD FOR PHASE NOISE REDUCTION IN VERY HIGH FREQUENCY SPECTRUM

(71) Applicant: Apple Inc., Cupertino, CA (US)

(72) Inventors: Oghenekome Oteri, San Diego, CA (US); Haitong Sun, Cupertino, CA (US); Chunhai Yao, Beijing (CN); Yushu Zhang, Beijing (CN); Dawei Zhang, Saratoga, CA (US); Chunxuan Ye, San Diego, CA (US); Weidong Yang, San Diego, CA (US); Wei Zeng, Saratoga, CA (US); Hong He, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,592

(22) PCT Filed: May 14, 2020

(86) PCT No.: PCT/CN2020/090288
§ 371 (c)(1),
(2) Date: Sep. 21, 2021

(87) PCT Pub. No.: WO2021/226943
PCT Pub. Date: Nov. 18, 2021

(65) Prior Publication Data
US 2023/0076789 A1    Mar. 9, 2023

(51) Int. Cl.
*G08C 17/00* (2006.01)
*H04L 5/00* (2006.01)
(Continued)

(52) U.S. Cl.
CPC ......... *H04W 52/245* (2013.01); *H04L 5/0048* (2013.01); *H04W 52/325* (2013.01); *H04W 52/346* (2013.01)

(58) Field of Classification Search
CPC ............. H04W 52/245; H04W 52/325; H04W 52/346; H04W 72/0457; H04L 5/0048; H04L 5/0023
(Continued)

(56) References Cited

U.S. PATENT DOCUMENTS 9,439,153 B1 *   9/2016  Vivanco ................ H04W 52/34
10,461,907 B2 * 10/2019  Lee ............................ H04L 1/00
(Continued)

FOREIGN PATENT DOCUMENTS

CN     108900286 A    11/2018
CN     109150444 A     1/2019
(Continued)

OTHER PUBLICATIONS

ZTE, et al., "Discussion on RS for phase tracking," 3GPP TSG RAN WG1 Meeting #88, R1-1701817, Feb. 17, 2017 (Feb. 17, 2017).
(Continued)

*Primary Examiner* — Amancio Gonzalez
(74) *Attorney, Agent, or Firm* — Blank Rome LLP

(57) ABSTRACT

Various techniques are presented to improve phase tracking reference signal (PTRS) performance with respect to very high frequency communications. According to some embodiments, increased power boosting may be applied to improve PTRS performance, while still keeping power spectral density (PSD) within ETSI Broadband Radio Access Networks (BRAN) limits. In some cases, the power boosting may be semi-static and/or dynamic. In other embodiments, the improved performance may be achieved by dynamically changing time and/or frequency density of the PTRS. In other embodiments, a multi-port configuration may be used for the downlink PTRS. In other embodiments, one or more PTRS configurations may be determined per SCS and/or frequency band, e.g., based on traffic type,
(Continued)

channel priority, parameters signaled in the slot format indication (SFI), etc. In other embodiments, common phase error (CPE) estimates may be obtained for those OFDM symbols without PTRS by interpolating the available PTRS estimates in the time domain.

22 Claims, 16 Drawing Sheets

(51) Int. Cl.
*H04W 52/24* (2009.01)
*H04W 52/32* (2009.01)
*H04W 52/34* (2009.01)

(58) Field of Classification Search
USPC .......................................................... 370/311
See application file for complete search history.

(56) References Cited

U.S. PATENT DOCUMENTS

| | | | | |
|---|---|---|---|---|
| 10,644,855 | B2* | 5/2020 | Lee | H04B 7/0478 |
| 10,785,005 | B2* | 9/2020 | Lee | H04L 1/00 |
| 10,911,197 | B2* | 2/2021 | Wang | H04L 5/0042 |
| 10,972,238 | B2* | 4/2021 | Zhang | H04W 72/0446 |
| 10,998,994 | B2* | 5/2021 | Lee | H04L 5/0048 |
| 11,109,325 | B2* | 8/2021 | Qi | H04W 52/346 |
| 11,424,885 | B2* | 8/2022 | Wu | H04W 72/0453 |
| 11,477,813 | B2* | 10/2022 | Lee | H04L 5/0048 |
| 11,510,229 | B2* | 11/2022 | Liu | H04W 52/146 |
| 11,601,240 | B2* | 3/2023 | Liu | H04W 72/23 |
| 11,678,363 | B2* | 6/2023 | Akkarakaran | H04L 5/0091 370/329 |
| 2015/0318969 | A1* | 11/2015 | Morioka | H04W 52/143 370/336 |
| 2016/0157246 | A1* | 6/2016 | Suzuki | H04L 5/0048 370/329 |
| 2019/0182001 | A1 | 6/2019 | Lee | |
| 2020/0014513 | A1 | 1/2020 | Lee | |
| 2020/0107307 | A1* | 4/2020 | Nammi | H04L 5/0051 |
| 2021/0307031 | A1* | 9/2021 | Chen | H04L 5/001 |
| 2021/0359818 | A1* | 11/2021 | Zewail | H04L 5/0048 |
| 2022/0124829 | A1* | 4/2022 | Matsuda | H04W 74/0866 |
| 2022/0279451 | A1* | 9/2022 | Yoshioka | H04W 52/383 |
| 2022/0385427 | A1* | 12/2022 | Frenne | H04L 5/0051 |
| 2022/0417867 | A1* | 12/2022 | Yoshioka | H04W 52/325 |

FOREIGN PATENT DOCUMENTS

| | | |
|---|---|---|
| CN | 110463130 A | 11/2019 |
| GB | 2572390 A | 10/2019 |

OTHER PUBLICATIONS

ZTE, et al., "Discussion on RS for phase tracking," 3GPP TSG RAN WG1 NR Ad-Hoc Meeting, R1-1700138, Jan. 20, 2017 (Jan. 20, 2017).

* cited by examiner

800 →

| PTRS | PUSCH/PDSCH | PTRS | PUSCH/PDSCH |

820 →

| PTRS | BORROW PWR | PUSCH/PDSCH | PTRS | BORROW PWR | PUSCH/PDSCH |

840 →

| PTRS 1 | | PUSCH/PDSCH | PTRS 1 | | PUSCH/PDSCH |
| | PTRS 2 | PUSCH/PDSCH | | PTRS 2 | PUSCH/PDSCH |

860 →

| PTRS 1 | BORROW PWR | PUSCH/PDSCH | PTRS 1 | BORROW PWR | PUSCH/PDSCH |
| BORROW PWR | PTRS 2 | PUSCH/PDSCH | BORROW PWR | PTRS 2 | PUSCH/PDSCH |

*FIG. 8*

SYSTEM AND METHOD FOR PHASE NOISE REDUCTION IN VERY HIGH FREQUENCY SPECTRUM

FIELD

The present application relates to wireless devices, and more particularly to apparatus, systems, and methods for handling phase noise (PN) in very high frequency spectrum, e.g., millimeter wave (MMW or mmWave) spectrum, in a wireless communication system.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for improved handling phase noise (PN) in very high frequency spectrum, e.g., millimeter wave (MMW or mmWave) spectrum, in a wireless communication systttytem, such as 5G NR. In 5G NR, mmWave refers to the portion of the frequency spectrum in the millimeter-wave frequency range, which technically ranges from about 30 GHz to 300 GHz. Recent 5G NR studies have focused on the bandwidth available at mmWave frequencies between 24 GHz and 100 GHz. Signals in the mmWave frequency range can be easily absorbed by objects in their propagating path, such as buildings, trees, and human body parts. Successfully dealing with phase noise has been another issue in designing mmWave communication systems. When severe phase noise is present in a communication link, the link performance can be substantially degraded. The time unit to obtain phase noise estimates determines the ultimate bound within which the receiver is able to correct phase noise. However, mmWave signals also promise many benefits, such as greater bandwidth, capacity, faster transmission speeds, and smaller antennae. Thus, it would be desirable to utilize techniques to compensate for phase noise in a reliable fashion for mmWave and other very high frequency spectrum communications.

Radios in wireless communications devices include oscillators to generate or tune into specific radio frequencies (RF). Real, i.e., non-ideal, oscillators can experience significant phase noise, which is random fluctuations in the phase of a waveform generated by the oscillators. As frequencies increase, it can become harder to produce oscillators that have good PN properties, and, thus, PN can become more problematic as RF frequencies increase.

As mentioned above, in certain cases, RF systems may be deployed in very high frequencies bands, which could be up to 100 GHz or higher, where the impact of PN can be quite significant. For example, in certain configurations of bandwidth usage, going from 45 GHz to 70 GHz can result in over four times the amount of expected phase error, which is approximately equal to a 6.4 dB drop in power. Generally, studies have shown that PN increases with increasing frequency and with increasing bandwidth.

In Rel-15, a Phase Tracking Reference Signal (PT-RS or PTRS) was specified for both downlink and uplink communications, specifically for Cyclic Prefix-Orthogonal Frequency Division Multiplexing (CP-OFDM) and Discrete Fourier Transform spread Orthogonal Frequency Division Multiplexing (DFT-S-OFDM). The PTRS may be used to help compensate for the phase shift. The PTRS may be a pseudo-random sequence, e.g., in some embodiments, the PTRS may be based on a length-31 Gold sequence. A Gold sequence includes $2^n+1$ sequences, with a period of $2^n-1$, and, within a Gold sequence, a number of ones and zeros differs by one.

PN in an OFDM system transmitted through a flat channel may be broken down into two components. The first component is a Common Phase Error (CPE) that is added to every subcarrier and is proportional to its value multiplied by a complex number. CPE affects every subcarrier equally and is typically easily corrected by PTRS. The second component is an Inter-Carrier-Interference (ICI) error that is the summation of the information of the other subcarriers, each multiplied by a complex number, which comes from an average of phase noise with a spectral shift and has appearance of Gaussian noise. Typically, the ICI is not easily corrected.

The subcarrier spacing (SCS) selected for a given wireless communication system determines the ratio of CPE to ICI. At the SCS increases, a larger portion of the total PN is CPE, and a smaller portion is ICI. Ideally, selecting a very large SCS results in a large, correctable CPE. The PN could also cause phase shift in time domain. In the frequency domain, a CPE for all subcarriers could be dominant. Thus, increasing SCS can help mitigate the impact of PN, but this can decrease the available bandwidth in the wireless communication system. Moreover, in order to optimize system performance, it has been determined that the system bandwidth and the SCS should preferably not be selected independently from one another.

In certain cases, the amount of frequency bandwidth and/or time (e.g., in terms of a number of OFDM symbols) used for the PTRS may be configured. An amount of PTRS needed in a given scenario may vary, for example, based on the quality of the oscillators being used, carrier frequency, SCS, modulation and coding schemes being used, etc. In certain cases, PTRS may be configured in terms of frequency density and/or time density. The PTRS may be associated with a particular demodulation reference signal (DMRS) port and may be configured to be transmitted within the scheduled bandwidth and duration of a scheduled physical downlink shared channel (PDSCH) or physical uplink shared channel (PUSCH). In an OFDM system, PN typically changes over time, but tends to be relatively constant over various frequencies. Thus, according to some embodiments, a PTRS may be configured to be sent relatively densely in time, but relatively sparsely in frequency.

The techniques described herein may be implemented in and/or used with a number of different types of devices, including but not limited to cellular phones, wireless devices, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various embodiments is considered in conjunction with the following drawings, in which:

FIG. 8 illustrates example PTRS configurations, in accordance with aspects of the present disclosure;

Figure 1:
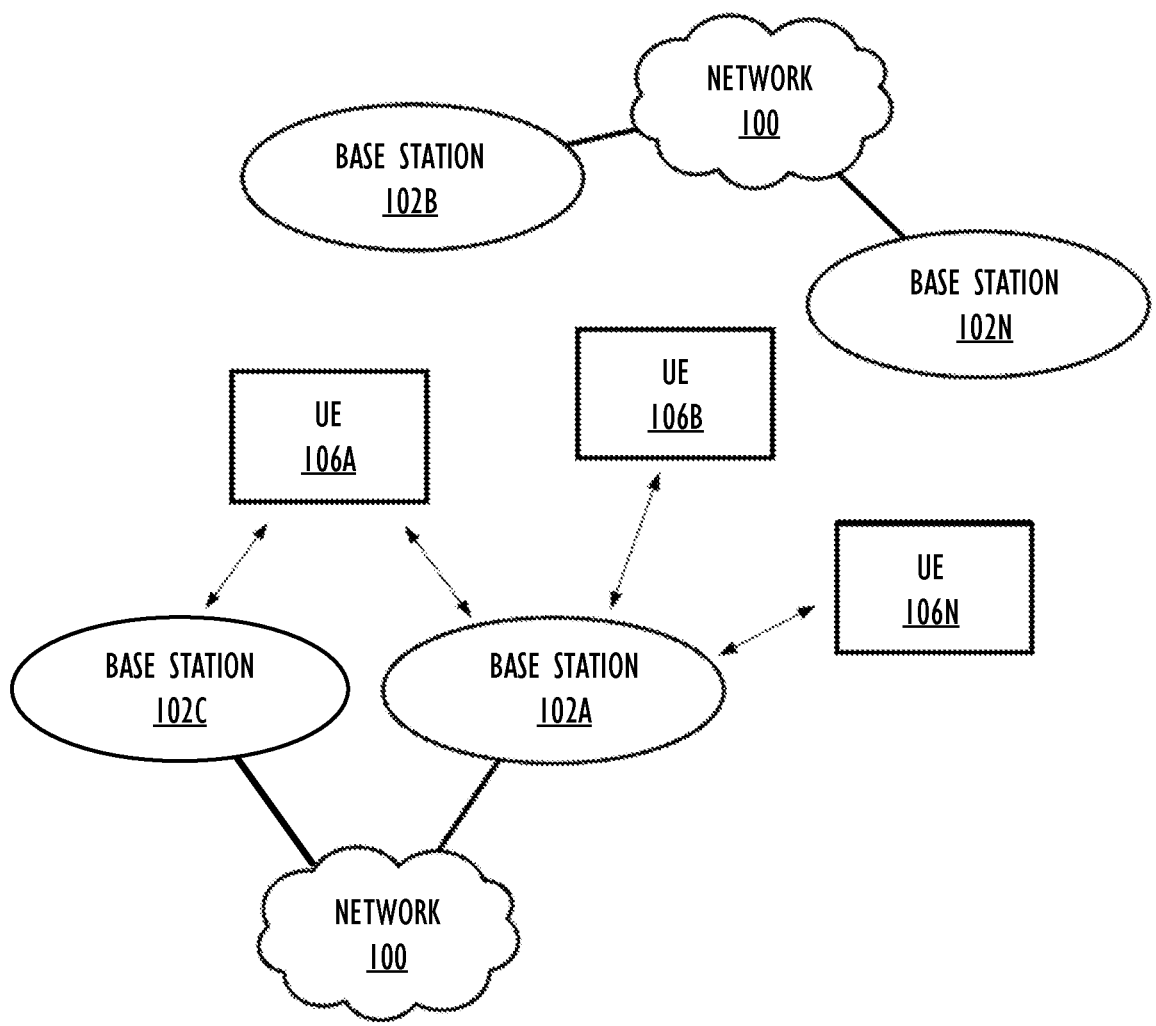
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Various techniques are presented herein to improve PTRS performance compared with Rel-15 and, in particular, with respect to very high frequency, e.g., mmWave, communications. According to some embodiments, increased power boosting may be applied to improve PTRS performance, while still keeping power spectral density (PSD) within ETSI Broadband Radio Access Networks (BRAN) limits. In some cases, the power boosting may be semi-static and/or dynamic. In other embodiments, the improved performance may be achieved by dynamically changing time/frequency density of the PTRS. In other embodiments, a multi-port configuration may be used for the downlink PTRS. In still other embodiments, one or more PTRS configurations may be determined per SCS and/or frequency band, e.g., based on traffic type, channel priority, parameters signaled in the slot format indication (SFI) at the beginning of a slot, etc. In yet other embodiments, CPE estimates may be obtained for those OFDM symbols without PTRS by interpolating the available PTRS estimates in the time domain.

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")— any of various types of computer systems or devices that are mobile or portable and that perform wireless communications. Examples of UE devices include mobile telephones or smart phones (e.g., iPhone™ Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to" Reciting a component that is configured to perform one or more tasks is expressly intended not to invoke 35 U.S.C. § 112(f) interpretation for that component.

Turning now to FIG. 1, a simplified example of a wireless communication system is illustrated, according to some embodiments. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB." In some embodiments, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Figure 2:
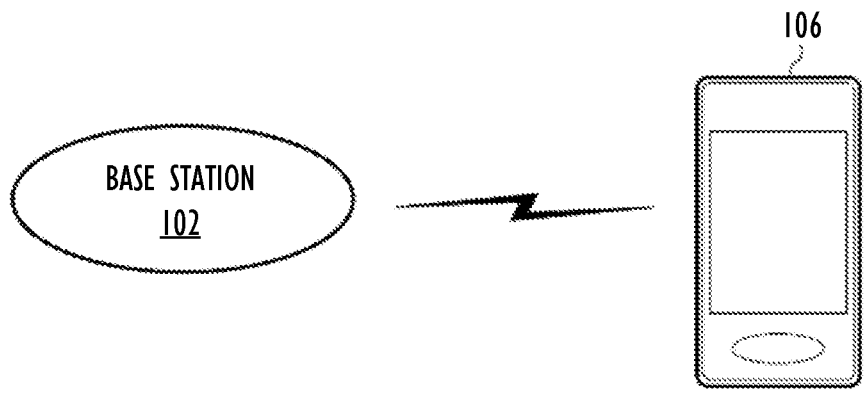
FIG. 2 illustrates a base station (BS) in communication with a user equipment (UE) device, according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/ eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
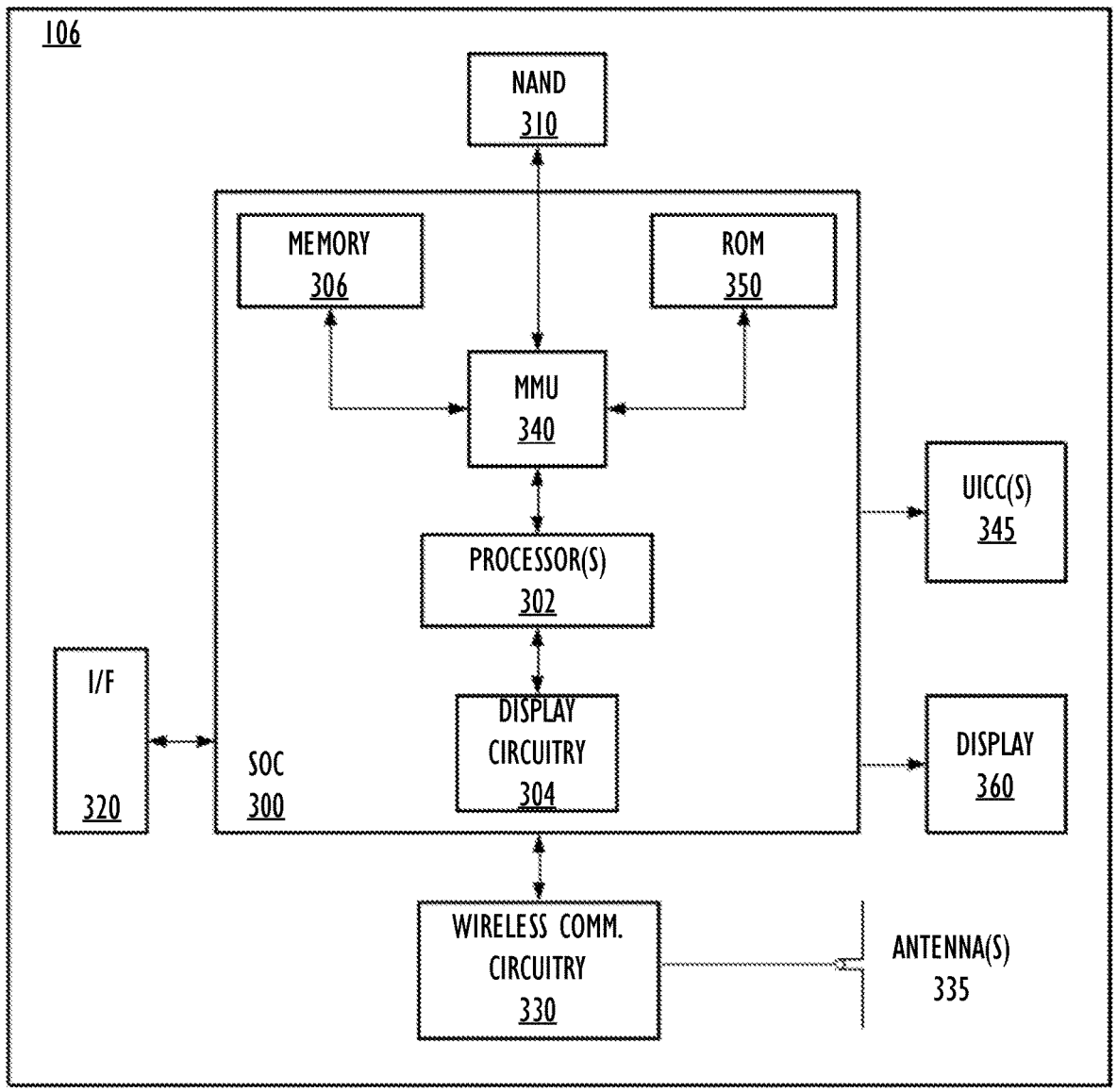
FIG. 3 illustrates an example block diagram of a UE, according to some Embodiments.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain. In some embodiments, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
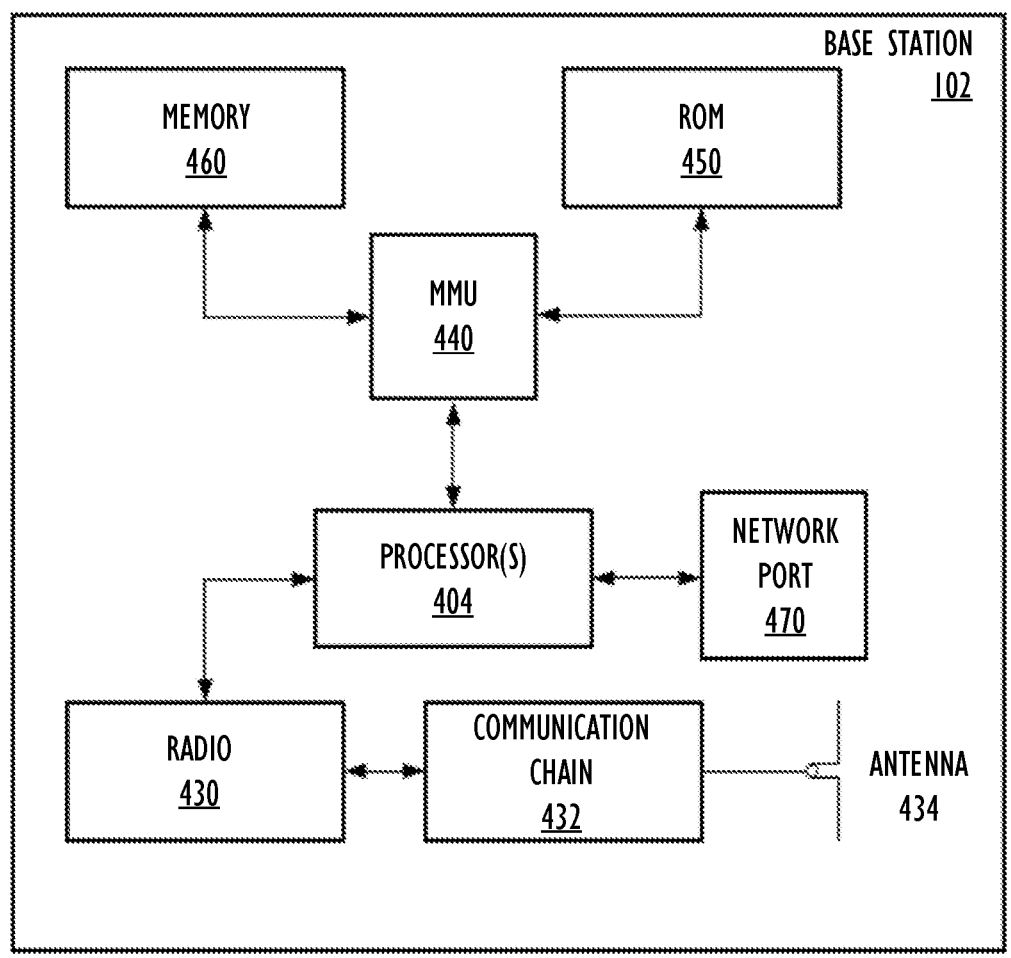
FIG. 4 illustrates an example block diagram of a BS, according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB." In such embodiments, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
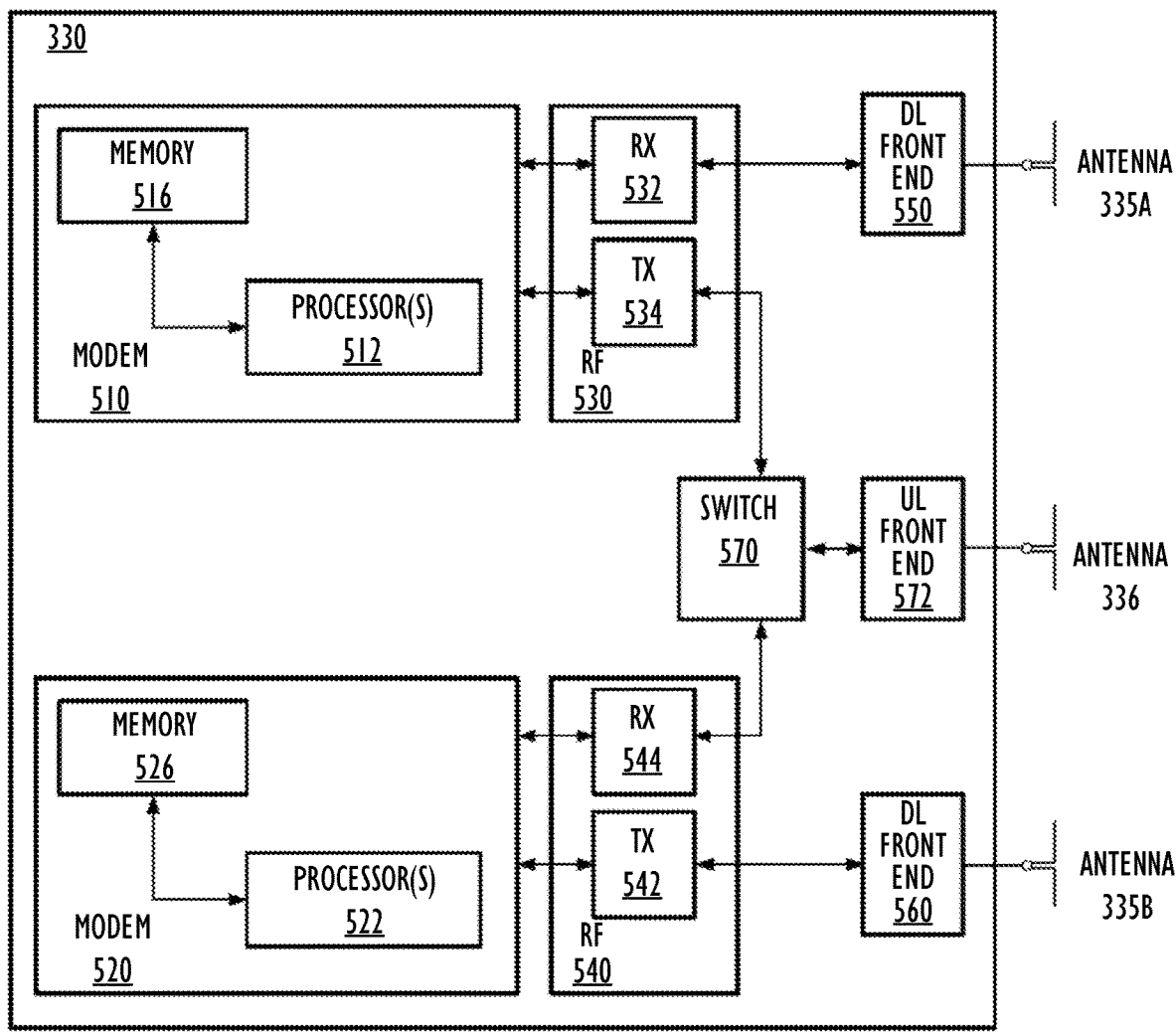
FIG. 5 illustrates an example block diagram of cellular communication circuitry, according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figure 6:
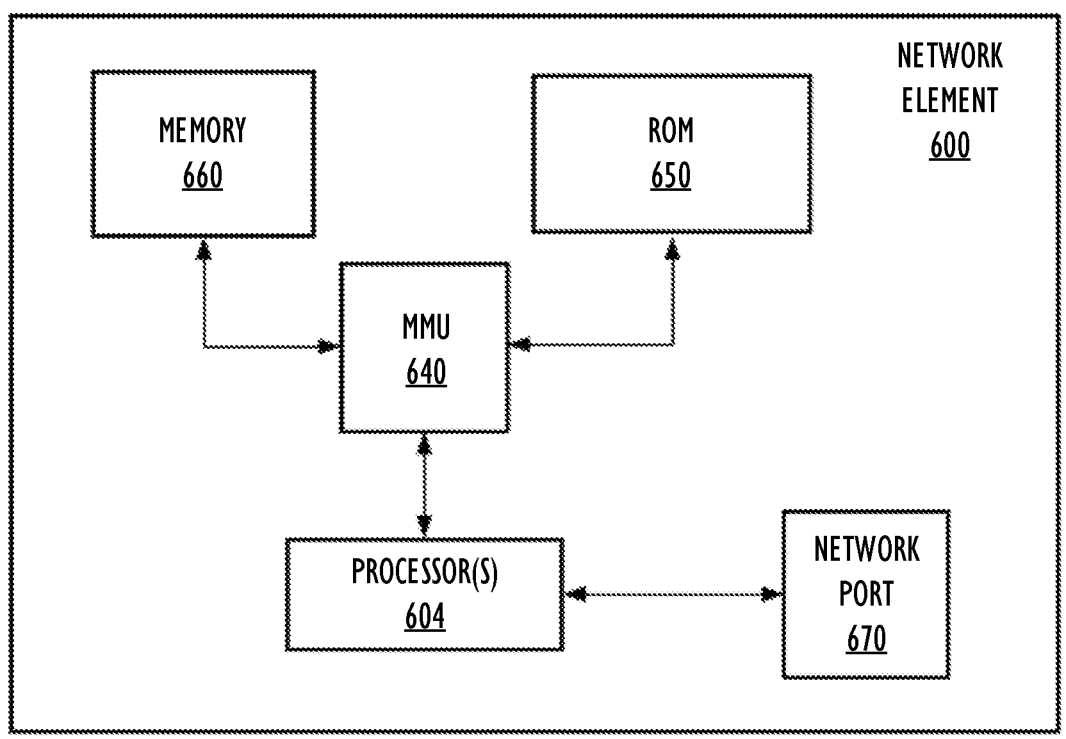
FIG. 6 illustrates an example block diagram of a network element, according to some embodiments.

FIG. 6 illustrates an exemplary block diagram of a network element 600, according to some embodiments. According to some embodiments, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
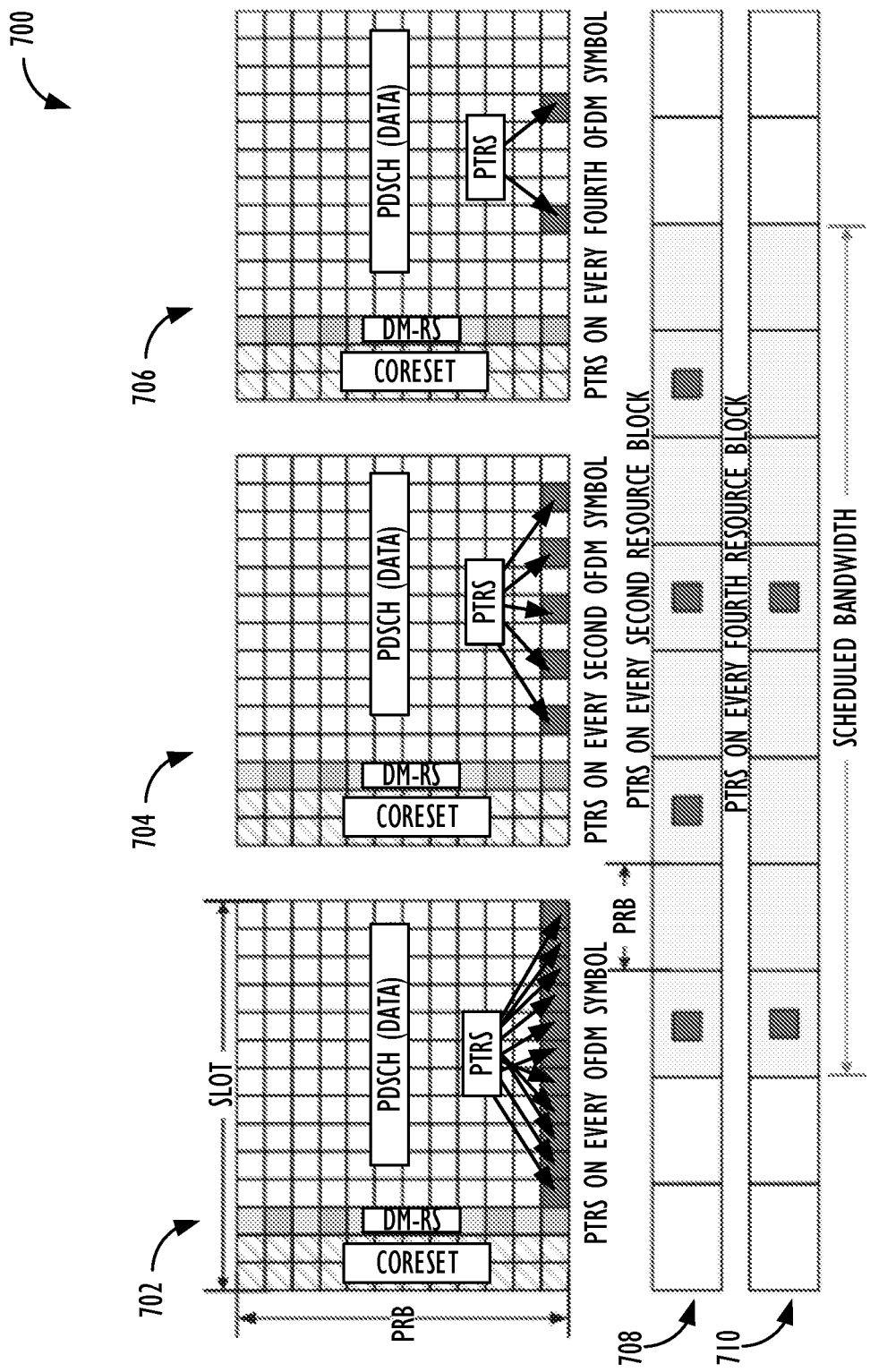
FIG. 7 illustrates various PTRS configurations, in accordance with aspects of the present disclosure.

Turning now to FIG. 7, various PTRS configurations 700 are illustrated. In a first example PTRS configuration 702, a PTRS is transmitted on every OFDM symbol of an allocated PDSCH in a particular physical resource block (PRB). In a second example PTRS configuration 704, the PTRS is transmitted on every second OFDM symbol of the allocated PDSCH, and in a third example PTRS configuration 706, the PTRS is transmitted every fourth OFDM symbol.

While example PTRS configurations 702, 704, and 706 vary on the time domain, PTRS configurations 708 and 710 illustrate example PTRS configuration that vary on a frequency domain. In example PTRS configuration 708, every second PRB includes a PTRS, which in example PTRS configuration 710, every fourth PRB includes a PTRS. There may be a trade-off between phase tracking accuracy and signaling overhead. If the density of PTRS is relatively high, either in time or frequency, for example in PTRS configuration 702, phase tracking accuracy is relatively high, and CPE can be better compensated for to achieve higher performance. However, the higher the PTRS density, the larger the signaling overhead, which results in a lower spectral efficiency and/or effective transmission rate.

In certain cases, the power with which a PTRS is transmitted can enable an increase in performance of the PTRS in countering PN. In certain cases, PTRS transmitting power may be boosted, relative to the PDSCH/PUSCH transmission by borrowing power from another MIMO layer, such as power for discontinuous transmission (DTX) on other antenna ports by puncturing the other layer and using the power allocated for the other layer to be used for the PTRS transmission. Borrowing power from other MIMO layers is effective if the ports share a power amplifier, such as when digital beamforming is used. However, at higher frequencies, such as frequencies above about 45 GHz, analog beamforming may be used. Where analog beamforming is used, separate power amplifiers may be used per layer, which limits the ability to borrow power across layers.

Turning now to FIG. 8, additional example PTRS configurations are illustrated, in accordance with aspects of the present disclosure. Here, PTRS configuration 800 illustrates a PTRS transmitted on a single port without a power boost across a set of frequencies. As shown, the PTRS is transmitted in conjunction with either a PDSCH or a PUSCH, where the PDSCH/PUSCH are transmitted at different frequencies than the PTRS. Where the ability to borrow power for transmitting the PTRS is limited or unavailable, power may be borrowed from resource elements for other frequencies instead.

As an example, in PTRS configuration 820, power is borrowed from a portion of the PDSCH/PUSCH frequencies, and this power is used to boost the transmission power of the PTRS on the frequencies allocated for the PTRS. The portion of the PDSCH/PUSCH that the power is being borrowed from may be rate matched around or punctured. For rate matching, a rate of transmission may be adjusted to effectively squeeze the information corresponding to the frequencies where the power is being borrowed from into the remaining frequencies. For puncturing, the information corresponding to the frequencies where the power is being borrowed from are simply dropped. The information may be retransmitted at a later time.

In certain cases, multiple PTRS's may be transmitted on multiple ports, as illustrated in PTRS configuration 840. In PTRS configuration 840 when a PTRS is transmitted on a first port (i.e., PORT 1), there is a corresponding blank resource element (RE) on the other port (i.e., PORT 2). In such cases, power may be borrowed from the pre-powered second port for the blank RE, as shown in PTRS configuration 860. In the single port and multi-port boosted PTRS configurations, signaling may be used to indicate a boosted PTRS. For example, a wireless node, such as a gNB, may indicate a type of power boost, such as frequency-based boost or a layer-based boost. As another example, a wireless device may indicate to the wireless node a preferred or supported type of power boost, such as a part of capability signaling.

In certain cases, power spectral density (PSD) limits for the boosted PTRS may apply. For example, unlicensed bands may be subject to a maximum mean equivalent isotropically radiated power (EIRP) density. In certain cases, PSD may be detected and measured, either by a wireless device or wireless node. As PSD is observed, the PTRS may be boosted or not boosted, based on the observed PSD. In certain cases, a wireless device or wireless node may be able to be switched between boosted PTRS and non-boosted PTRS autonomously, for example using dynamic signaling. For example, on the downlink side, the wireless node may indicate whether boosted or non-boosted PTRS is to be used, to the wireless device, via downlink control information (DCI)/medium access control (MAC) control element (MAC-CE) signaling for the PDSCH. Similarly, on the uplink side, the wireless node may indicate whether boosted or non-boosted PTRS is to be used, to the wireless device, e.g., via DCI/MAC-CE signaling for the PUSCH. In other cases, the wireless node may explicitly configure or signal the wireless device as to whether to use a boosted or non-boosted PTRS. This configuration may be based on an indication, by the wireless device, of the preferred and/or supported configurations of the wireless device.

In certain cases, switching between boost and no boost modes of operation may be binary or quantized. For example, in certain cases, boosting the power of the PTRS may be either enabled or disabled based on the observed PSD. In other cases, levels of boost may be defined, in addition to no boost, for the PTRS. These levels may be predefined based on the observed PSD, or boost may be set to a higher or lower boost level as needed, based on the observed PSD. In other cases, the amount of power by which to boost the PTRS may be dynamically adjusted over a range of possible boosts, based on the observed PSD. Adjusting the power boost to apply to the PTRS is possible, too, e.g., if the PTRS is a Gold sequence and a measurement of the phase of the signal, rather than the amplitude of the signal, provides sufficient information for PN compensation.

In certain cases, a time density of the PTRS may be dynamically adjusted based on the PSD of the PTRS. In such cases, the PSD would remain constant, and the frequency of the PTRS would be constant, but additional PTRS signaling may be added or removed over time. This may help increase energy (and hence performance) over time, but it can also result in increased density and lower spectral efficiency.

In certain cases, a frequency density of PTRS signaling may be adjusted to increase the amount of PTRS signaling to help compensate for PN. For example, where PSD limits of a wireless node or wireless device are reached and performance is still relatively low, additional PTRS signaling may be added in frequency, or the PTRS frequency mapping may be changed. The added PTRS signaling may be removed if PN decreases. In some cases, adjusting the frequency density of the PTRS signaling may be performed only after attempting to boost the power of the PTRS signaling (e.g., when the PSD limits are reached). However, in other cases, adjusting the frequency density of the PTRS signaling may also be performed independently of the power boosting.

Where the overall signal is modulated using orthogonal frequency division multiplexing (OFDM), a number of resource elements (REs) containing the PTRS signal may be increased. In certain cases, additional REs including the PTRS may be distributed substantially evenly across a set of allocated bandwidth or bandwidth part (BWP). In other cases, it may be advantageous to create groups of PTRS. PTRS groups and a number of PTRS samples per group may be varied, for example, from configurations having one group with X samples per group to configurations having Y groups with one sample per group.

Figure 9:
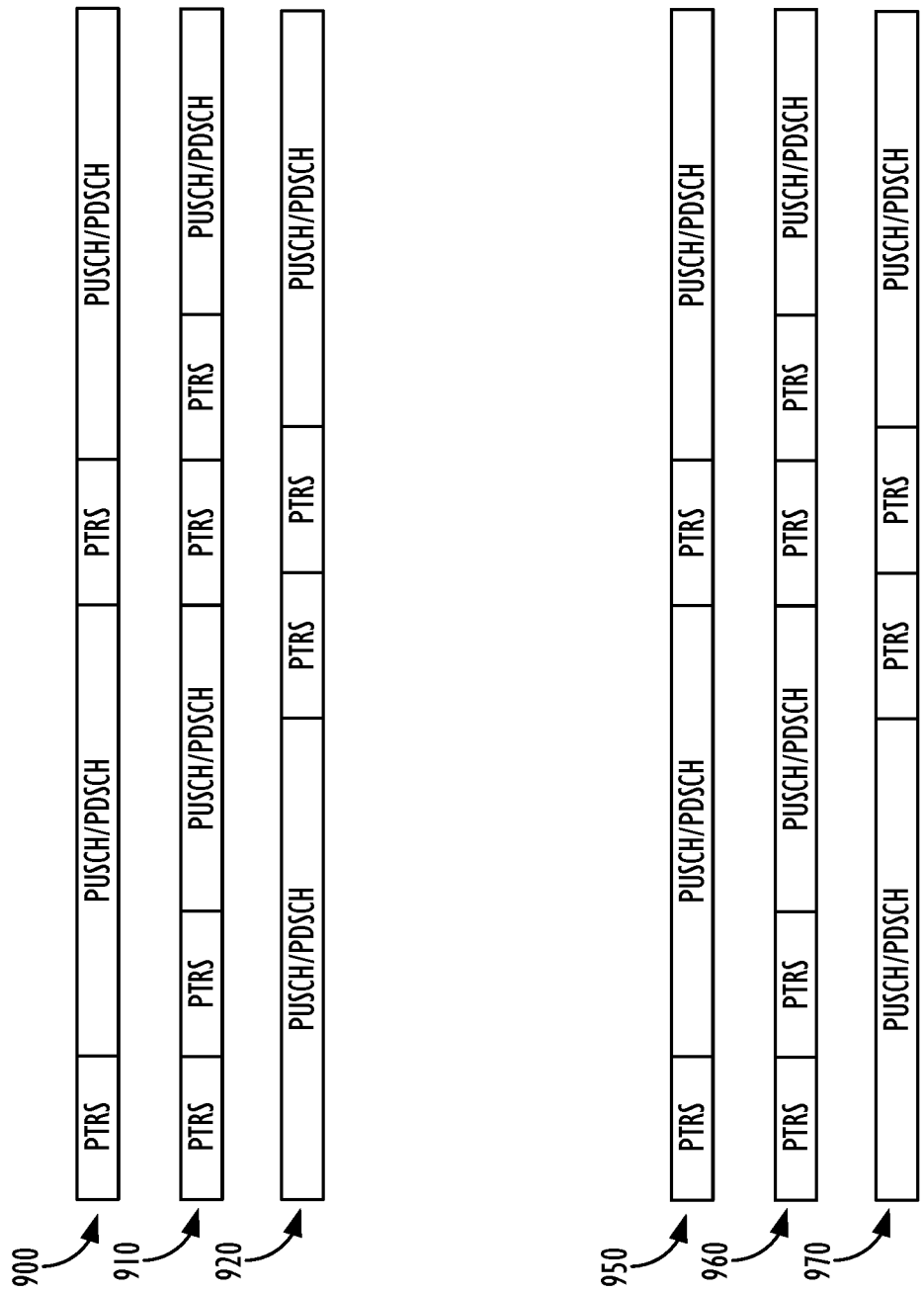
FIG. 9 illustrates example grouped PTRS configurations in the frequency domain, in accordance with aspects of the present disclosure.

FIG. 9 illustrates example grouped PTRS configurations in the frequency domain, in accordance with aspects of the present disclosure. A first grouped PTRS configuration 900 illustrates two groups of PTRS for a bandwidth (or BWP), where each group of PTRS includes a single sample, which takes one RE. As another example, second grouped PTRS configuration 910 again includes two PTRS groups for the bandwidth (or BWP), but this time each PTRS group includes two samples in two REs. In a third example, third grouped PTRS configuration 920 includes one group of PTRS for the bandwidth (or BWP), but the PTRS group includes two samples in two REs.

In certain cases, groups may be defined by a resource block (RB) interval for the PTRS with Z number of samples per RE interval. For example, a fourth grouped PTRS configuration 950 has a four RE interval for the PTRS with one sample in one RE allocated per interval, such that a PTRS of one RE in length is transmitted every four REs allocated for PUSCH/PDSCH. As another example, a fifth PTRS configuration 960 has a four RE interval for the PTRS with two samples in two REs allocated per interval, such that a PTRS of two REs in length is transmitted for every four REs. As another example, a sixth PTRS configuration 970 has a four RE interval for the PTRS with two samples in two REs allocated per interval, along with a five RE offset, such that the first PTRS is transmitted in the fifth RE. Where the signal is modulated using Discrete Fourier Transform spread OFDM (DFT-s-OFDM), a number of PTRS groups may be similarly increased and, optionally, a number of samples per group may be decreased.

In certain cases, changes in the frequency density may be made dynamically, for example, based on the current PSD. In certain cases, this change may be directed by the wireless node. For example, when changing the frequency density of the downlink, the wireless node may signal a frequency and time mapping for the PTRS along with the PDSCH for each transmission. As another example, when changing the frequency density of the uplink, the wireless device may indicate one or more desired PTRS configurations to the wireless node, for example using L1 signaling, or MAC-CE. Signaling via MAC-CE may allow for faster changes in PTRS configuration, but may have more overhead requirements as compared to L1 signaling. The wireless node may then modify the PTRS configuration for the next uplink opportunity, for example in a DCI signal. In certain cases, changes in the frequency density may be made autonomously either by the wireless node or by the wireless device. In such cases, the wireless node or wireless device may transmit an indication of the time/frequency mapping of the PTRS for each transmission or for a set of PTRS transmissions, for example in a DCI signal or RRC signal.

In certain cases, multi-port PTRS may be implemented to increase the amount of PTRS signaling to help compensate for PN. Generally, enabling multi-port PTRS assumes that the physical resources for multi-port transmissions are available, including an independent oscillator per beam, layer, and/or panel is available at the wireless node and the wireless device. A PTRS port may be a logical port for transmitting or receiving a PTRS, based on a unique combination of antennas, beams, layers, and/or panels. As an example of multi-port PTRS on the downlink, more than one PTRS may be used and in certain cases, a number of PTRS ports may be increased from two to four ports for both uplink and downlink. Where multi-port PTRS is configured, signaling to indicate a PTRS/DMRS association may be used to indicate that a PTRS is associated with a particular DMRS port. A number of bits for this signaling may be based on a number of PTRS ports being configured. For example, where four PTRS ports are configured four bits may be used to indicate the association, similarly for two bit may be used for two PTRS ports and three bits used for three PTRS ports. In cases where PTRS is not configured and a transform precoder is enabled or disabled, or if a precoding matrix variable maxRank is equal to 1, the number of bits for the PTRS/DMRS association may be zero. In certain cases, the association between PTRS and DMRS ports may be indicated as shown in the following four tables:

TABLE 1

1 DMRS port: PTRS-DMRS association for UL, DL PTRS port 0

| Bit 0 | Bit 1 | DMRS port |
| --- | --- | --- |
| 0 | 0 | 1st scheduled DMRS port |
| 0 | 1 | 2nd scheduled DMRS port |
| 1 | 0 | 3rd scheduled DMRS port |
| 1 | 1 | 4th scheduled DMRS port |

TABLE 2

2 Ports: PTRS-DMRS association for UL/DL PTRS ports 0, 1

| Bit 0 | DMRS port | Bit 1 | DMRS port |
| --- | --- | --- | --- |
| 0 | 1st DMRS port which shares PTRS port 0 | 0 | 1st DMRS port which shares PTRS port 1 |
| 1 | 2nd DMRS port which shares PTRS port 0 | 1 | 2nd DMRS port which shares PTRS port 1 |

TABLE 5

3 Ports: PTRS DMRS association for UL/DL PTRS ports 0, 1, 2

| Bit 0 | DMRS port | Bit 1 | DMRS port | Bit 2 | DMRS port |
| --- | --- | --- | --- | --- | --- |
| 0 | 1st DMRS port which shares PTRS port 0 | 0 | 1st DMRS port which shares PTRS port 1 | 0 | 1st DMRS port which shares PTRS port 2 |
| 1 | 2nd DMRS part which shares PTRS port 0 | 1 | 2nd DMRS port which shares PTRS port 1 | 1 | 2nd DMRS port which shares PTRS port 2 |

TABLE 4

4 Ports: PTRS-DMRS association for UL/DL PTRS ports 0, 1, 2, 3

| Bit 0 | DMRS port | Bit 1 | DMRS port | Bit 2 | DMRS port | Bit 3 | DMRS port |
|---|---|---|---|---|---|---|---|
| 0 | 1st DMRS port which shares PTRS port 0 | 0 | 1st DMRS port which shares PTRS port 1 | 0 | 1st DMRS port which shares PTRS port 2 | 0 | 1st DMRS port which shares PTRS port 3 |
| 1 | 2nd DMRS part which shares PTRS port 0 | 1 | 2nd DMRS part which shares PTRS port 1 | 1 | 2nd DMRS part which shares PTRS port 2 | 1 | 2nd DMRS part which shares PTRS port 3 |

In certain cases, a number of bits indicating the PTRS/DMRS association may be fixed between 0 and 4. In cases where there a single PTRS port and a fixed number of bits used, the PTRS port may be mapped to up to 16 DMRS ports as shown in Table 5 below.

TABLE 5

1 DMRS port: PTRS-DMRS association for UL, DL PTRS port 0

| Bit 0 | Bit 1 | Bit 2 | Bit 3 | DMRS port |
|---|---|---|---|---|
| 0 | 0 | 0 | 0 | 1st scheduled DMRS port |
| 0 | 0 | 0 | 1 | 2nd scheduled DMRS port |
| 0 | 0 | 1 | 0 | 3rd scheduled DMRS port |
| 0 | 0 | 1 | 1 | 4th scheduled DMRS port |
| 0 | 1 | 0 | 0 | 5th scheduled DMRS port |
| 0 | 1 | 0 | 1 | 6th scheduled DMRS port |
| 0 | 1 | 1 | 0 | 7th scheduled DMRS port |
| 0 | 1 | 1 | 1 | 8th scheduled DMRS port |
| 1 | Bit 1 | 0 | 0 | 9th scheduled DMRS port |
| 1 | 0 | 0 | 1 | 10th scheduled DMRS port |
| 1 | 0 | 1 | 0 | 11th scheduled DMRS port |
| 1 | 0 | 1 | 1 | 12th scheduled DMRS port |
| 1 | 0 | 0 | 0 | 13th scheduled DMRS port |
| 1 | 1 | 0 | 1 | 14th scheduled DMRS port |
| 1 | 1 | 1 | 0 | 15th scheduled DMRS port |
| 1 | 1 | 1 | 1 | 18th scheduled DMRS port |

In cases where there are two PTRS ports mapped to four DMRS ports with a fixed number of indication bits used, the mapping may use either the first two most significant bits (MSB) or two least significant bits (LSB) and may be based on the mapping shown in Table 6 below.

TABLE 6

2 Ports: PTRS-DMRS association for UL/DL PTRS ports 0, 1 with 4 bit signaling

| Bit 0 | Bit 1 | DMRS port | Bit 2 | Bit 3 | DMRS port |
|---|---|---|---|---|---|
| 0 | 0 | 1st DMRS port which shares PTRS port 0 | 0 | 0 | 1st DMRS port which shares PTRS port 1 |
| 0 | 1 | 2nd DMRS port which shares PTRS port 0 | 0 | 1 | 2nd DMRS port which shares PTRS port 1 |
| 1 | 0 | 3rd DMRS port which shares PTRS port 0 | 1 | 0 | 3rd DMRS port which shares PTRS port 1 |
| 1 | 1 | 4th DMRS port which shares PTRS port 0 | 1 | 1 | 4th DMRS port which shares PTRS port 1 |

In cases where there are three PTRS ports, up to two DMRS ports may be mapped per PTRS using a fixed number of indication bits by using the first three most-significant bits (MSB) or last three MSB. Similarly, where there are four PTRS ports being mapped with up to two DMRS ports per PTRS, the mapping may be as shown above in Table 4.

In certain cases, a layer indicator (LI) report, in a CSI report may be used to indicate to a wireless node, a preferred PTRS precoder. If multiple PTRS ports are used, the wireless device may be configured to report multiple LIs to the wireless node. In certain cases, multiple LI reports may be included in a single CSI report. In other cases, a single LI report may be configured to indicated preferred PR-RS precoders for multiple PTRS ports.

In certain cases, a PTRS configuration may be based on the SCS used. A PTRS configuration may determine a number of RBs and modulation and coding scheme (MCS) used for the PTRS. In accordance with aspects of the present disclosure, a PTRS configuration may be determined based in part on a frequency band of the transmission. For example, a particular PTRS configuration may be used when transmitting between approximately 50 GHz and 71 GHz.

In certain cases, an indication may be provided to indicate a frequency band associated with a PTRS configuration. This indication may be used, for example, where a SCS is shared for multiple frequency bands. In other cases, a new PTRS configuration may be defined for a frequency band with a different SCS configuration than other frequency bands. In such cases, the SCS configuration would indicate the frequency band. In other cases, an amendable table (e.g., configuration) may be defined based on a component carrier (CC) or BWP, such that a particular combination of CC and BWP implies a PTRS configuration. In other cases, multiple configurations may be defined for a given SCS and/or frequency band. In such cases, a specific PTRS configuration for uplink or downlink may be determined based on a number of factors, such as a traffic type, channel priority, or signaling in a slot format indicator (SFI). As an example, for a particular SCS/frequency band, different PTRS configurations may be based on whether the type of traffic to be carried is URLLC traffic versus eMBB traffic. By tailoring the PTRS configuration to a type of traffic, the PTRS may be configured to provide, for example, higher reliability for URLLC traffic, while trading off some high bandwidth capability and vice versa for eMBB traffic. As another example, different PTRS configurations may be based on a PUSCH priority or a priority of a HARQ-ACK associated with a PDSCH transmission. In another example, a PTRS configuration may be slot specific and the configuration may be based on a parameter signaled in an SFI at a beginning of a slot.

In certain cases, a PTRS does not appear in each OFDM symbol, and CPE estimates for ODFM symbols without a PTRS may be interpolated based on available PTRS estimates in the time domain. This interpolation can potentially increase detection latency and buffering requirements for receiving a transmission. Additionally, at higher frequencies, such as above approximately 50 GHz, beams are generally quite narrow and target specific wireless devices. Additionally, at higher frequencies, bandwidths are relatively wide. In such cases a transmission may be very brief, often only one or two symbols long. Interpolating PTRS in such systems may be challenging. In certain cases, where there a transmission is only one symbol long, a PTRS may be omitted at a DMRS will be transmitted in the one symbol. In cases where the transmission is longer than one symbol, a time density of the PTRS may be set to one. By setting the time density of the PTRS to one, a PTRS may be sent for each symbol. In certain cases, a time density of the PTRS may be set to one if the transmission is two symbols and if the number of symbols is greater than 2, then use a configured time density. In other cases, where a number of symbols is greater than one, then a configured time density may be used, and a PTRS may always be transmitted on the last symbol. Transmitting the PTRS on the last symbol avoids potential issues from interpolating across multiple symbols at the edge of a signal.

Figure 10:
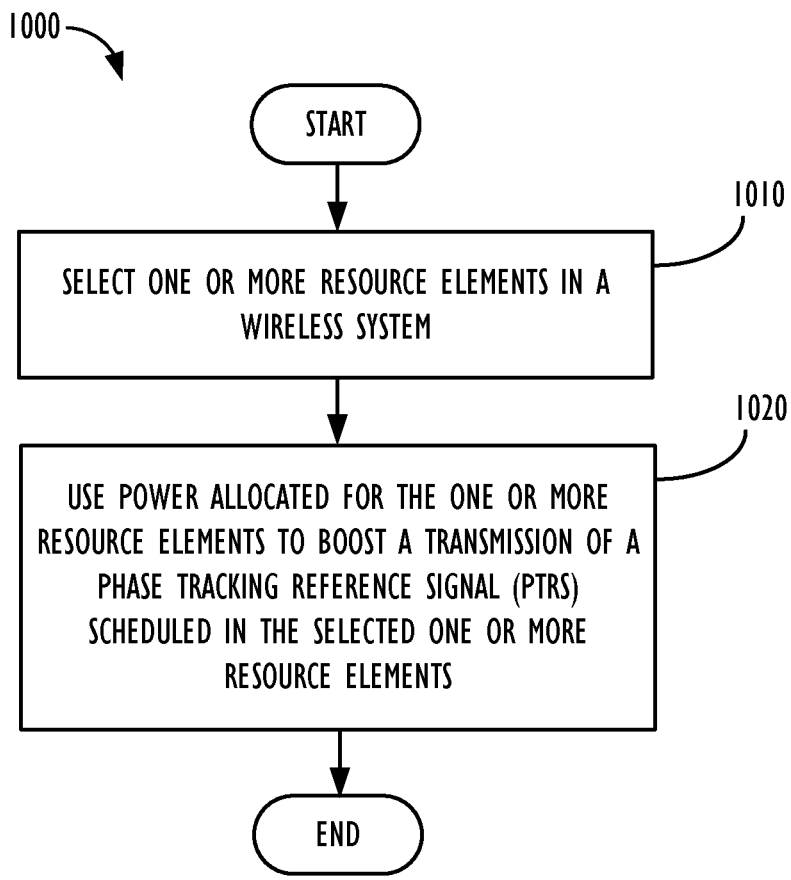
FIG. 10 is a flowchart illustrating an example technique for phase noise compensation in a wireless system, in accordance with aspects of the present disclosure.

FIG. 10 is a flowchart illustrating an example technique for phase noise compensation 1000 in a wireless system. At block 1010, one or more resource elements are selected. At block 1020, power allocated for the one or more resource elements at another frequency are used to boost a transmission of a phase tracking reference signal (PTRS) scheduled in the selected one or more resource elements.

Figure 11:
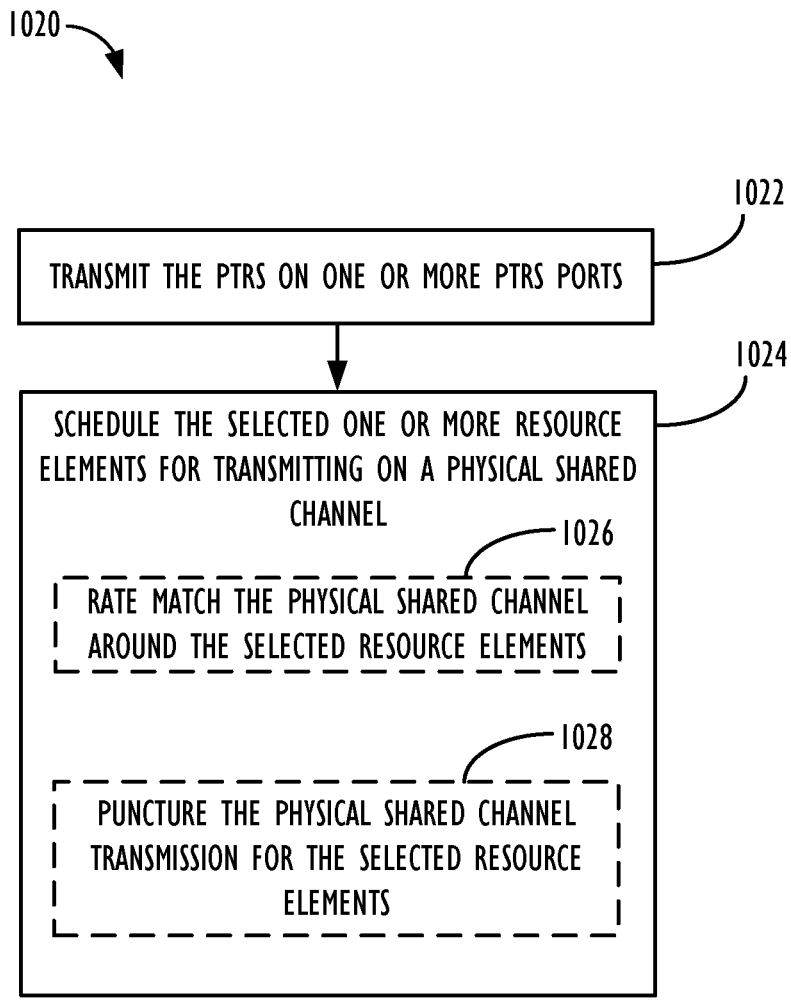
FIG. 11 is a flowchart illustrating an example technique for phase noise compensation in a wireless system, in accordance with aspects of the present disclosure.

FIG. 11 is a flowchart illustrating an example technique for phase noise compensation 1020 in a wireless system, in accordance with aspects of the present disclosure. At block 1022, the PTRS is transmitted on one or more PTRS ports. The PTRS port can be understood as a logical port defined based on a combination of antennas, antenna elements, beams, layers, etc. In certain cases, a PTRS may be transmitted on one PTRS port, and on other cases, PTRS may be transmitted on multiple PTRS ports. Power may be borrowed from PUSCH/PDSCH resource elements in either case. At block 1024, the selected one or more resource elements are scheduled for transmitting a physical shared channel and wherein the power allocated for transmitting the physical shared channel in the selected one or more resource elements is used to transmit the PTRS in the selected one or more resource elements. As an example, power for resource elements originally allocated for a PUSCH or PDSCH transmissions may be borrowed and this power may be used to transmit the PTRS. In certain cases, at block 1026, rate matching may be performed on the physical shared channel around the selected one or more resource elements. For example, rate matching attempts to adjust a transmission rate of the remaining portions of the PUSCH/PDSCH to fit the original PUSCH/PDSCH message, including the portions from which power was borrowed. In certain cases, at block 1028, the physical shared channel is punctured for the selected one or more resource elements to transmit the PTRS. Note that dashed lines indicate optional steps or pathways that may be performed.

Figure 12:
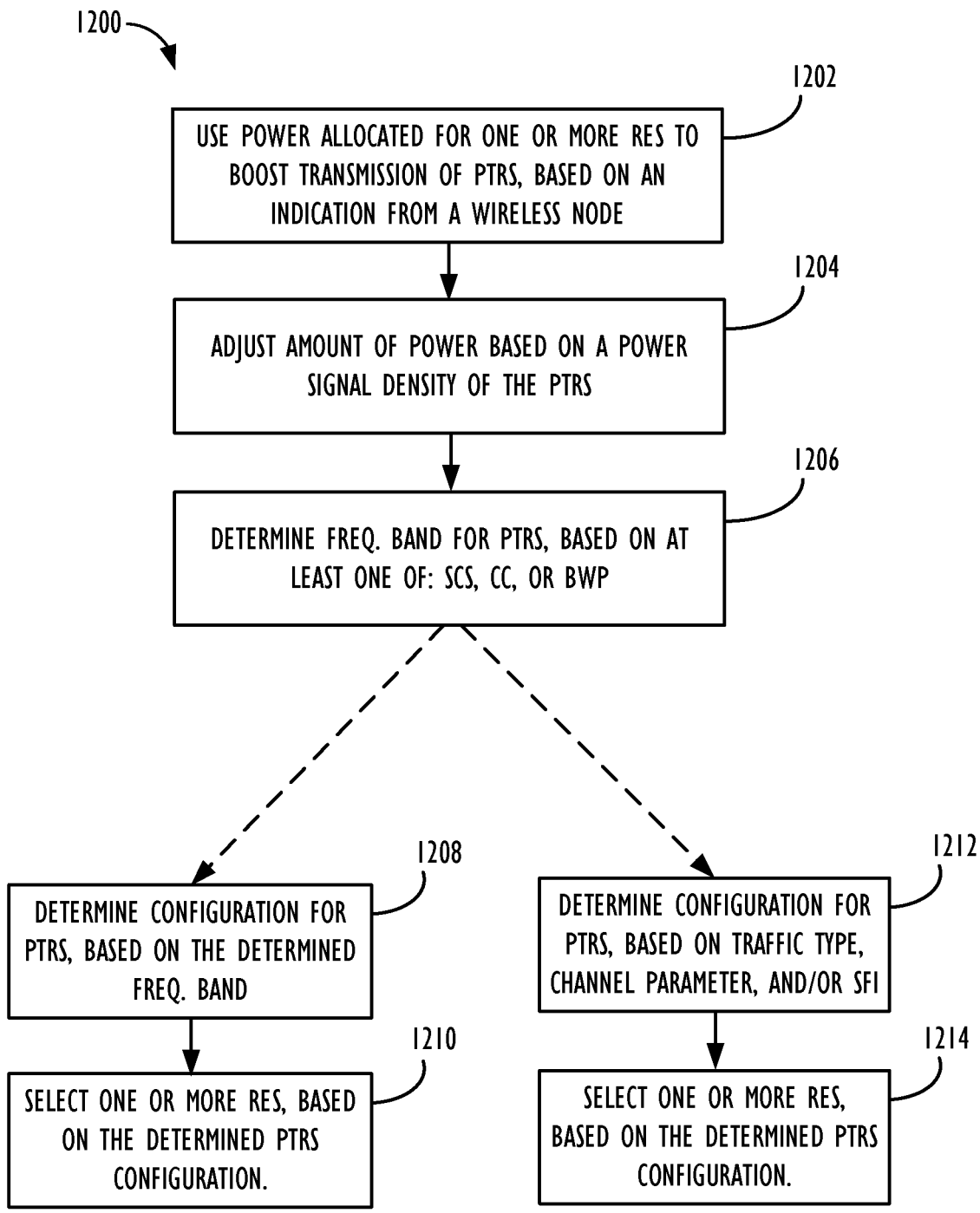
FIG. 12 is a flowchart illustrating an example technique for phase noise compensation in a wireless system, in accordance with aspects of the present disclosure.

FIG. 12 is a flowchart illustrating an example technique for phase noise compensation 1200 in a wireless system, in accordance with aspects of the present disclosure. At block 1202, the use of power allocated for one or more resource elements to boost the transmission of the PTRS may be based on an indication from a wireless node. In certain cases, this indication may be a configuration message. At block 1204, the amount of power used to boost the transmission of the PTRS may be adjusted based on a power density measurement or estimate. This measurement or estimate may be made either by the wireless device or the wireless node. If the measurement is made by the wireless node, the indication to use power boosting may include an indication of how much power to use. In certain cases, the amount of boost to apply may be binary (e.g., on or off) or quantized (e.g., based on defined power levels). In other cases, the amount of boost to apply may be configurable within a range. In certain cases, a number of REs to use for boosting the PTRS may be selected based on the power signal density measurement or estimate.

At block 1206, a frequency band may be determined based on a frequency band of a transmission, where the frequency band is based on at least one of a SCS, CC, or BWP. At block 1208, a configuration for the PTRS may be determined based on the determined frequency band. At block 1210, one or more resource elements may be selected based on the determined PTRS configuration. At block 1212, a PTRS configuration may be determined based on one of a traffic type of a transmission, a channel priority, or a parameter in a slot format indicator. At block 1214, one or more resources elements may be selected based on the determined PTRS configuration.

Figure 13:
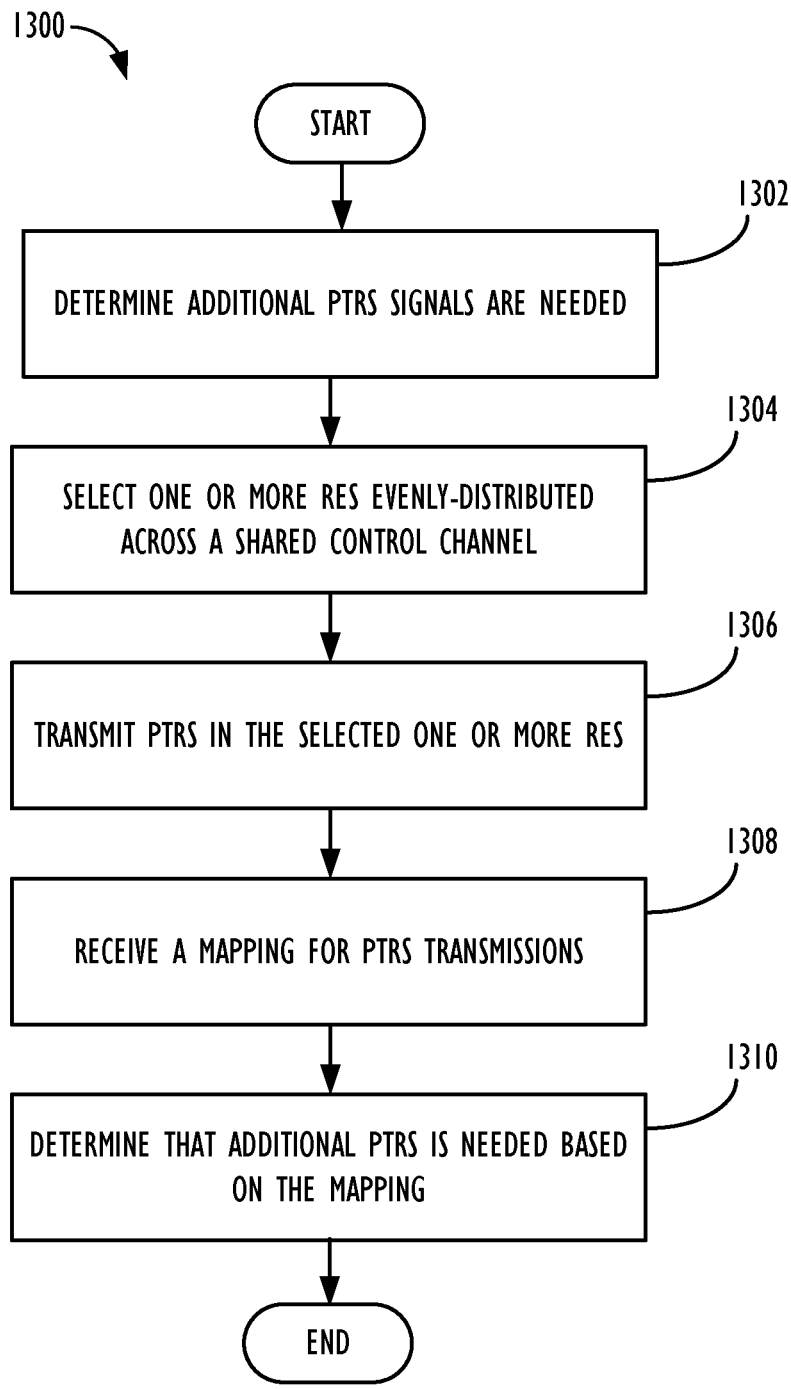
FIG. 13 is a flowchart illustrating an example technique for phase noise compensation in a wireless system, in accordance with aspects of the present disclosure.

FIG. 13 is a flowchart illustrating an example technique for phase noise compensation 1300 in a wireless system, in accordance with aspects of the present disclosure. At block 1302, a determination that additional phase tracking reference signals (PTRS) are needed is made. For example, this determination may be made if performance is low due to PN and the transmissions are already at or near PSD limits. In other cases, the determination may be based on a PTRS configuration. The PTRS configuration may be determined based on the frequency band of the transmission, a traffic type of a transmission, a channel priority, or a parameter in a slot format indicator.

At block 1304, one or more resource elements allocated for a shared control channel are selected, wherein the selected resource elements are distributed across a bandwidth. In certain cases, the selected resource elements may be distributed relatively evenly across a bandwidth or BWP. In other cases, the selected resource elements may be distributed unevenly across a bandwidth or BWP. As an example, the selected resource elements may be grouped. The grouping may be based on a number of groups and a number of samples, or a number of samples per interval of resources blocks of the bandwidth or BWP.

At block 1306, a PTRS is transmitted in the selected one or more resource elements using a frequency allocated for the selected one or more resource elements. At block 1308, a mapping for the PTRS transmissions may be received. For example, the wireless device may receive a mapping transmitted from the wireless node. Alternatively, the wireless device may transmit a mapping for reception by the wireless node. This mapping may be based on a PSD measurement or estimate. At block 1310, a determination that additional PTRS is needed may be made based on the mapping. Additional PTRS may be received or transmitted based on the mapping.

Figure 14:
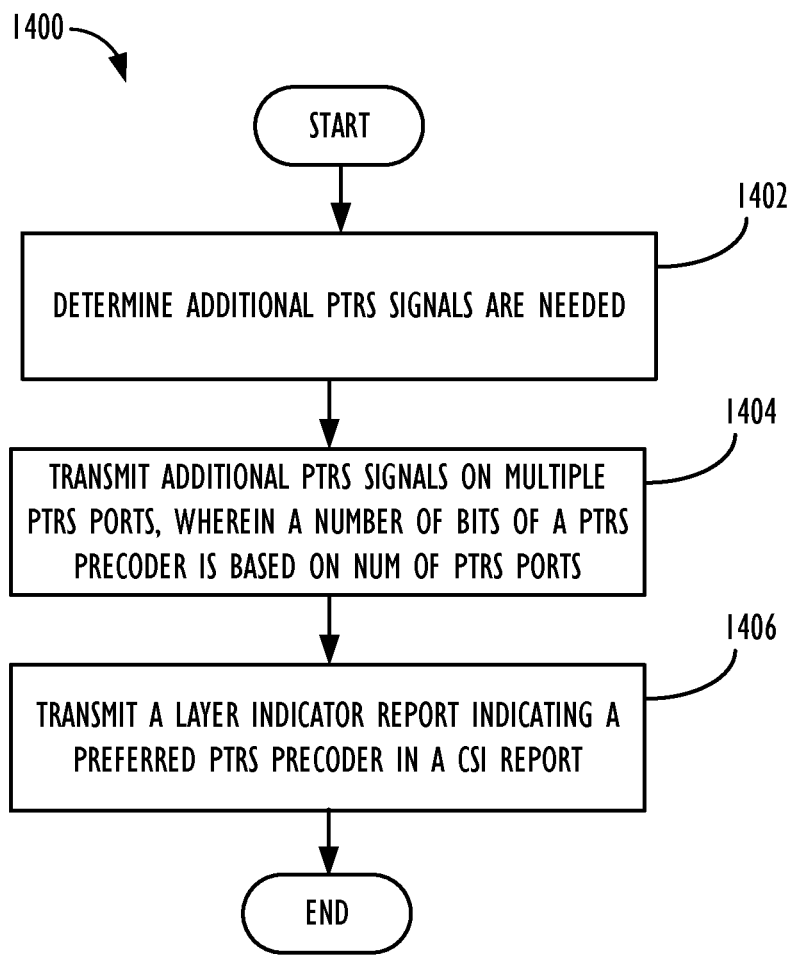
FIG. 14 is a flowchart illustrating an example technique for phase noise compensation in a wireless system, in accordance with aspects of the present disclosure.

FIG. 14 is a flowchart illustrating an example technique for phase noise compensation 1400 in a wireless system, in accordance with aspects of the present disclosure. At block 1402, a determination that additional phase tracking reference signals (PTRS) are needed is made. For example, this determination may be made if performance is low due to PN and the transmissions are already at or near PSD limits. In other cases, the determination may be based on a PTRS configuration. The PTRS configuration may be determined based on the frequency band of the transmission, a traffic type of a transmission, a channel priority, or a parameter in a slot format indicator. At block 1404, additional PTRS may be transmitted on multiple PTRS ports and wherein a number of bits of a PTRS precoder is based on a number of PTRS ports. In certain cases, the number of bits of the PTRS precoder may be selected from 0-4. At block 1406, a layer indicator report indicating a preferred PTRS precoder may be transmitted in a channel state information (CSI) report. In certain cases, the CSI report may include more than one layer.

Figure 15:
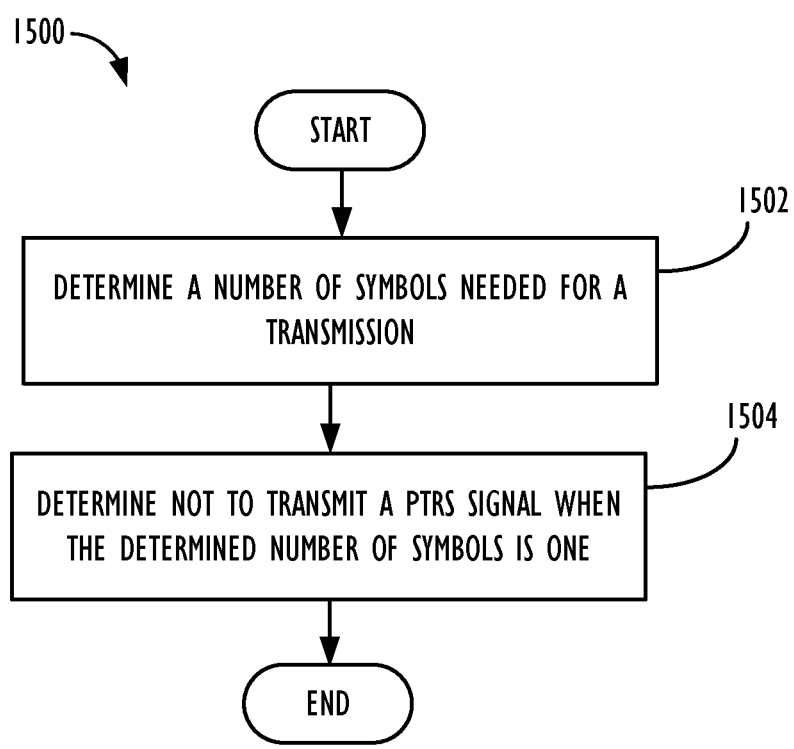
FIG. 15 is a flowchart illustrating an example technique for phase noise compensation in a wireless system, in accordance with aspects of the present disclosure.

FIG. 15 is a flowchart illustrating an example technique for phase noise compensation 1500 in a wireless system, in accordance with aspects of the present disclosure. At block 1502 a number of symbols needed for a transmission may be determined. At block 1504, a determination not to transmit a PTRS signal may be made when the determined number of symbols is one.

Figure 16:
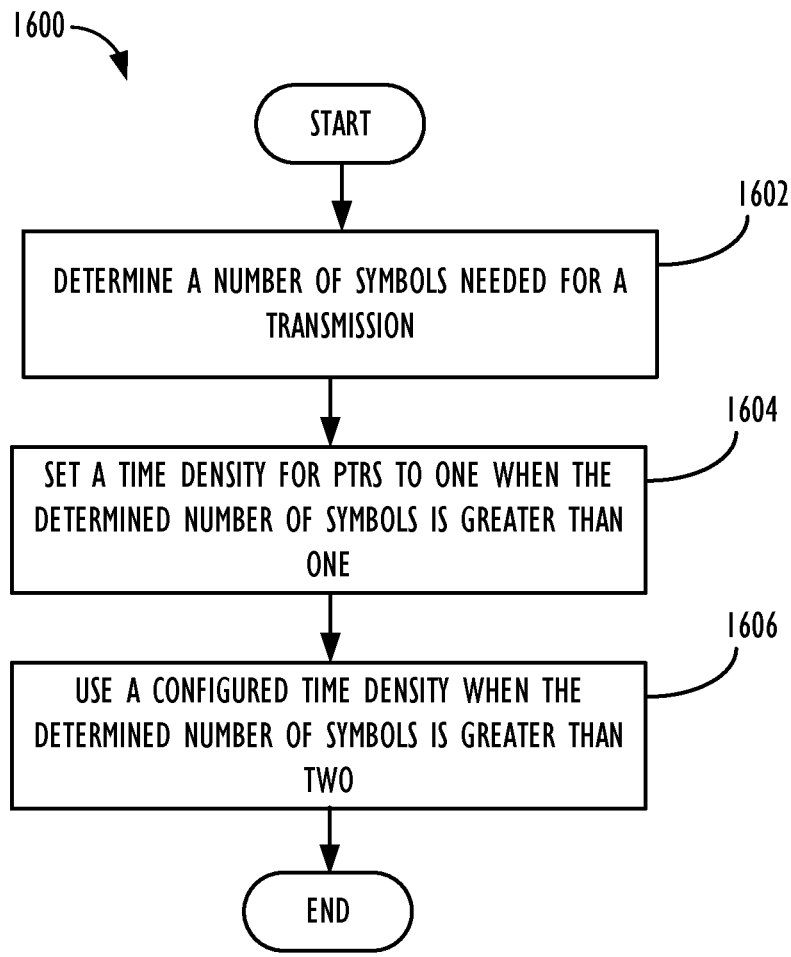
FIG. 16 is a flowchart illustrating an example technique for phase noise compensation in a wireless system, in accordance with aspects of the present disclosure.
Figure 17:
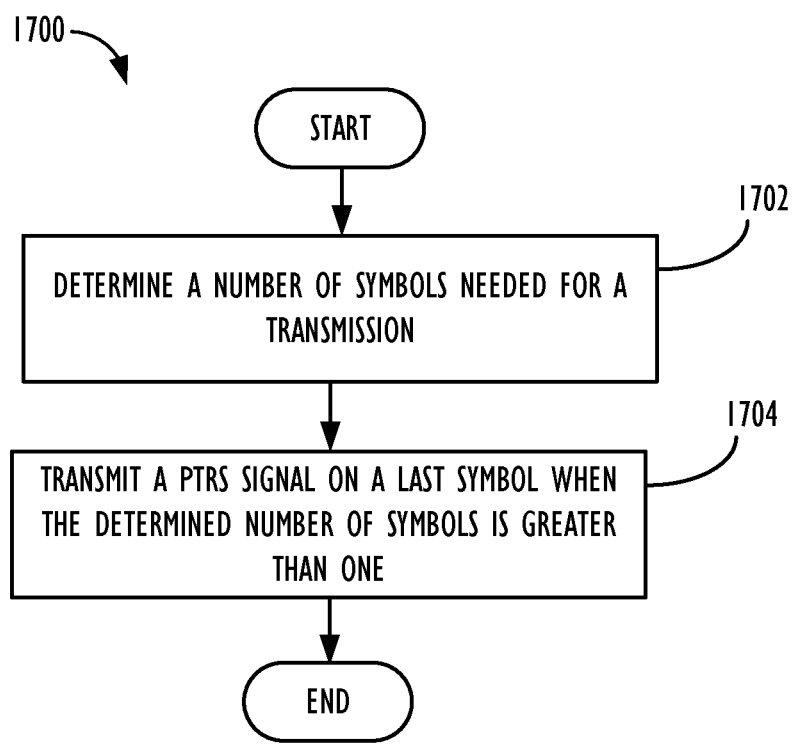
FIG. 17 is a flowchart illustrating an example technique for phase noise compensation in a wireless system, in accordance with aspects of the present disclosure.

FIG. 16 is a flowchart illustrating an example technique for phase noise compensation 1600 in a wireless system, in accordance with aspects of the present disclosure. At block 1602 a number of symbols needed for a transmission may be determined. At block 1604, a time density for a phase tracking reference signals (PTRS) is set to one when the determined number of symbols is greater than one. At block 1606, a configured time density is used when the determined number of symbols is greater than two FIG. 17 is a flowchart illustrating an example technique for phase noise compensation 1700 in a wireless system, in accordance with aspects of the present disclosure. At block 1702 a number of symbols needed for a transmission may be determined. At block 1704, a phase tracking reference signals is transmitted on a last symbol when the determined number of symbols is greater than one.

EXAMPLES

In the following sections, further exemplary embodiments are provided.

According to Example 1, a method for phase noise compensation in a wireless system is disclosed, comprising: selecting one or more resource elements; and using power allocated for the one or more resource elements at another frequency to boost a transmission of a phase tracking reference signal (PTRS) scheduled in the selected one or more resource elements.

Example 2 comprises the subject matter of Example 1, wherein the PTRS is transmitted on a single PTRS port, wherein the selected one or more resource elements are scheduled for transmitting a physical shared channel, and wherein the power allocated for transmitting the physical shared channel in the selected one or more resource elements is used to transmit the PTRS in the selected one or more resource elements.

Example 3 comprises the subject matter of Example 2, further comprising rate matching the physical shared channel around the selected one or more resource elements.

Example 4 comprises the subject matter of Example 3, further comprising puncturing the physical shared channel transmission for the selected one or more resource elements.

Example 5 comprises the subject matter of Example 1, wherein the PTRS is transmitted on multiple PTRS ports, and wherein the selected one or more resource elements are blank resource elements.

Example 6 comprises the subject matter of Example 1, wherein using power allocated for the one or more resource elements to boost the transmission of the PTRS is based on an indication from a wireless node.

Example 7 comprises the subject matter of Example 6, wherein the indication from the wireless node comprises a configuration message.

Example 8 comprises the subject matter of Example 6, wherein an amount of power to boost the transmission of the PTRS is adjusted based on a power signal density of the PTRS.

Example 9 comprises the subject matter of Example 8, wherein the amount of power to boost the transmission of the PTRS is either adjusted to boost the transmission or adjusted to not boost the transmission.

Example 10 comprises the subject matter of Example 6, wherein a number of resource elements selected is based on a power signal density of the PTRS.

Example 11 comprises the subject matter of Example 1, further comprising: determining a frequency band of a transmission, wherein the frequency band is determined based on at least one of a subcarrier spacing, component carrier, or bandwidth part; determining a PT-RSPTRS configuration based on the determined frequency band; and selecting the one or more resource elements based on the determined PT-RSPTRS configuration.

Example 12 comprises the subject matter of Example 1, further comprising: determining a PT-RSPTRS configuration based on one of a traffic type of a transmission, a channel priority, or a parameter in a slot format indicator; and selecting the one or more resource elements based on the determined PT-RSPTRS configuration.

Example 13 is a method for phase noise compensation in a wireless system, comprising: determining that additional phase tracking reference signals (PTRS) are needed; selecting one or more resource elements allocated for a shared control channel, wherein the selected resource elements are distributed across a bandwidth; and transmitting a PTRS in the selected one or more resource elements using a frequency allocated for the selected one or more resource elements.

Example 14 comprises the subject matter of Example 13, wherein the selected resource elements are distributed unevenly across the bandwidth.

Example 15 comprises the subject matter of Example 13, further comprising: determining one or more groups of PTRS transmissions, wherein the groups are based on one of: a number of groups for the bandwidth and a number of samples for each group of the number of groups, or a number of samples per interval of resource blocks of the bandwidth.

Example 16 comprises the subject matter of Example 13, further comprising: receiving a mapping for PTRS transmissions based on a power signal density; and determining that additional PTRS are needed based on the received mapping.

Example 17 comprises the subject matter of Example 13, further comprising: receiving a mapping for PTRS transmissions based on a power signal density; and receiving an additional PTRS based on the received mapping.

Example 18 comprises the subject matter of Example 13, further comprising: transmitting an indication of a PTRS configuration to a wireless node, the PTRS configuration determined based on a power signal density; and transmitting the PTRS based on the indication.

Example 19 comprises the subject matter of Example 13, further comprising: receiving an indication of a PTRS configuration from a wireless node, the PTRS configuration determined based on a power signal density; and receiving the PTRS based on the received mapping.

Example 20 is a method for phase noise compensation in a wireless system, comprising: determining that additional phase tracking reference signals (PTRS) are needed; and transmitting an additional PTRS on multiple PTRS ports and wherein a number of bits of a PTRS precoder is based on a number of PTRS ports.

Example 21 comprises the subject matter of Example 20, wherein the PTRS is transmitted on multiple PTRS ports and wherein a number of bits of a PTRS precoder is selected from 0 to 4.

Example 22 comprises the subject matter of Example 20, wherein the PTRS is transmitted on multiple PTRS ports and further comprising transmitting a layer indicator report indicating a preferred PT-RSPTRS precoder in a channel state information (CSI) report.

Example 23 comprises the subject matter of Example 22, wherein the CSI report indicates more than one layer.

Example 24 is a method for phase noise compensation in a wireless system, comprising: determining a number of symbols needed for a transmission; determining to not transmit a phase tracking reference signals (PTRS) when the determined number of symbols is one.

Example 25 is a method for phase noise compensation in a wireless system, comprising: determining a number of symbols needed for a transmission; setting a time density for a phase tracking reference signals (PTRS) to one when the determined number of symbols is greater than one.

Example 26 comprises the subject matter of Example 25, further comprising using a configured time density when the determined number of symbols is greater than two.

Example 27 is a method for phase noise compensation in a wireless system, comprising: determining a number of symbols needed for a transmission; transmitting a phase tracking reference signals (PTRS) to on a last symbol when the determined number of symbols is greater than one.

Example 28 comprises a method that includes any action or combination of actions as substantially described herein in the Detailed Description.

Example 29 comprises a method as substantially described herein with reference to each or any combination of the Figures included herein or with reference to each or any combination of paragraphs in the Detailed Description.

Example 30 comprises a wireless device configured to perform any action or combination of actions as substantially described herein in the Detailed Description as included in the wireless device.

Example 31 comprises a wireless station configured to perform any action or combination of actions as substantially described herein in the Detailed Description as included in the wireless station.

Example 32 comprises a non-volatile computer-readable medium that stores instructions that, when executed, cause the performance of any action or combination of actions as substantially described herein in the Detailed Description.

Example 33 comprises an integrated circuit configured to perform any action or combination of actions as substantially described herein in the Detailed Description.

Yet another exemplary embodiment may include a method, comprising, by a device, performing any or all parts of the preceding Examples.

A yet further exemplary embodiment may include a non-transitory computer-accessible memory medium comprising program instructions which, when executed at a device, cause the device to implement any or all parts of any of the preceding Examples.

A still further exemplary embodiment may include a computer program comprising instructions for performing any or all parts of any of the preceding Examples.

Yet another exemplary embodiment may include an apparatus comprising means for performing any or all of the elements of any of the preceding Examples.

Still another exemplary embodiment may include an apparatus comprising a processor configured to cause a device to perform any or all of the elements of any of the preceding Examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for phase noise compensation in a wireless system, comprising:
   transmitting a phase tracking reference signal (PTRS) according to a first boost configuration;
   measuring a power signal density of the PTRS at a first time;
   determining a second boost configuration for the PTRS based, at least in part, on the measured power signal density and a maximum mean Equivalent Isotropically Radiated Power (EIRP) density, wherein determining the second boost configuration further comprises determining to use power allocated for one or more resource elements at another frequency range for the PTRS; and
   transmitting the PTRS according to the second boost configuration.

2. The method of claim 1, wherein the one or more resource elements are scheduled for transmitting a physical shared channel, and wherein the power allocated for transmitting the physical shared channel in the one or more resource elements is used to transmit the PTRS in the one or more resource elements.

3. The method of claim 2, further comprising rate matching the physical shared channel around the one or more resource elements.

4. The method of claim 3, further comprising puncturing the physical shared channel transmission for the one or more resource elements.

5. The method of claim 1, wherein the PTRS is transmitted on multiple PTRS ports, and wherein the one or more resource elements are blank resource elements.

6. The method of claim 1, wherein using power allocated for the one or more resource elements to boost the transmission of the PTRS is based on an indication from a wireless node.

7. The method of claim 6, wherein a number of resource elements selected is based on the power signal density of the PTRS.

8. The method of claim 1, wherein an amount of power to adjust the transmission of the PTRS is either adjusted to boost the transmission or adjusted to not boost the transmission.

9. The method of claim 1, further comprising:
determining a frequency band of a transmission, wherein the frequency band is determined based on at least one of a subcarrier spacing, component carrier, or bandwidth part;
determining a PTRS configuration based on the determined frequency band; and
selecting the one or more resource elements based on the determined PTRS configuration.

10. The method of claim 1, further comprising:
determining a PTRS configuration based on one of a traffic type of a transmission, a channel priority, or a parameter in a slot format indicator; and
selecting the one or more resource elements based on the determined PTRS configuration.

11. The method of claim 1, further comprising:
measuring the power signal density of the PTRS at a second time; and
determining to transmit the PTRS according to the first boost configuration based, at least in part, on the measured power signal density of the PTRS at the second time.

12. A wireless device comprising:
one or more processors, wherein the one or more processors are configured to execute instructions causing the one or more processors to:
transmit a phase tracking reference signal (PTRS) according to a first boost configuration;
determine that additional PTRS are needed;
determine a second boost configuration for the PTRS based, at least in part, on a measured power signal density of the PTRS at a first time and a maximum mean Equivalent Isotropically Radiated Power (EIRP) density, wherein determining the second boost configuration further comprises determining to use power allocated for one or more resource elements at another frequency range for the PTRS; and
transmit a PTRS according to the second boost configuration.

13. The wireless device of claim 12, wherein the resource elements are distributed unevenly across the bandwidth.

14. The wireless device of claim 12, wherein the instructions further cause the one or more processors to:
determine one or more groups of PTRS transmissions, wherein the groups are based on one of:
a number of groups for the bandwidth and a number of samples for each group of the number of groups, or
a number of samples per interval of resource blocks of the bandwidth.

15. The wireless device of claim 12, wherein the instructions further cause the one or more processors to:
receive a mapping for PTRS transmissions based on the power signal density; and
determine that additional PTRS are needed based on the received mapping.

16. The wireless device of claim 12, wherein the instructions further cause the one or more processors to:
receive a mapping for PTRS transmissions based on the power signal density; and
receive an additional PTRS based on the received mapping.

17. The wireless device of claim 12, wherein the instructions further cause the one or more processors to:
transmit an indication of a PTRS configuration to a wireless node, the PTRS configuration determined based on the power signal density; and
transmit the PTRS based on the indication.

18. The wireless device of claim 12, wherein the instructions further cause the one or more processors to:
receive an indication of a PTRS configuration from a wireless node, the PTRS configuration determined based on the power signal density; and
receive the PTRS based on the received mapping.

19. The wireless device of claim 12, further comprising:
measuring the power signal density of the PTRS at a second time; and
determining to transmit the PTRS according to the first boost configuration based, at least in part, on the measured power signal density of the PTRS at the second time.

20. A non-transitory program storage device comprising instructions for performing phase noise compensation in a wireless system stored thereon to cause one or more processors to:
transmit a phase tracking reference signal (PTRS) according to a first boost configuration;
determine that additional phase tracking reference signals (PTRS) are needed;
determine a second boost configuration for the PTRS based, at least in part, on a measured power signal density of the PTRS at a first time and a maximum mean Equivalent Isotropically Radiated Power (EIRP) density, wherein determining the second boost configuration further comprises determining to use power allocated for one or more resource elements at another frequency range for the PTRS; and
transmit an additional PTRS of the additional PTRSs according to the second boost configuration on multiple PTRS ports and wherein a number of bits of a PTRS precoder is based on a number of PTRS ports.

21. The non-transitory program storage device of claim 20, wherein the additional PTRS is transmitted on multiple PTRS ports and wherein the number of bits of the PTRS precoder is selected from 0 to 4.

22. The non-transitory program storage device of claim 20, the instructions further comprising:
measuring the power signal density of the PTRS at a second time; and
determining to transmit the PTRS according to the first boost configuration based, at least in part, on the measured power signal density of the PTRS at the second time.

* * * * *

UNITED STATES PATENT AND TRADEMARK OFFICE
CERTIFICATE OF CORRECTION

PATENT NO. : 12,035,251 B2
APPLICATION NO. : 17/441592
DATED : July 9, 2024
INVENTOR(S) : Oghenekome Oteri et al.

It is certified that error appears in the above-identified patent and that said Letters Patent is hereby corrected as shown below:

In the Claims

Column 28, Line 40: replace the word "(PTRS)" with the word --(PTRSs)--

Signed and Sealed this
Sixth Day of August, 2024

Katherine Kelly Vidal
*Director of the United States Patent and Trademark Office*